United States Patent [19]
Snider

[11] 3,728,052
[45] Apr. 17, 1973

[54] AIR OPERATED TOOL

[75] Inventor: Philip A. Snider, Hicksville, Ohio
[73] Assignee: Dotko, Inc., Hicksville, Ohio
[22] Filed: Apr. 16, 1971
[21] Appl. No.: 134,587

[52] U.S. Cl. ............... 418/181, 418/270, 173/163, 408/234
[51] Int. Cl. ...... F01c 13/00, F01c 21/00, B23b 47/00
[58] Field of Search .................. 418/70, 181, 270; 415/503; 173/163; 408/234

[56] References Cited

UNITED STATES PATENTS

| | | | |
|---|---|---|---|
| 2,830,560 | 4/1958 | Doeden | 173/59 |
| 3,190,183 | 6/1965 | Walker et al. | 418/178 |
| 3,381,378 | 5/1968 | Lawrence et al. | 415/503 |
| 3,477,793 | 11/1969 | Kitagawa | 415/503 |

*Primary Examiner*—Carlton R. Croyle
*Assistant Examiner*—John J. Vrablik
*Attorney*—Oberlin, Maky, Donnelly & Renner

[57] ABSTRACT

An air operated tool characterized in that the tool chuck thereof has a pilot portion which is coaxial with the air motor rotor onto the shaft of which said chuck is screwed, and which engages a ball bearing in the tool housing so that the chuck and rotor will run true about their common axes despite eccentricity of the chuck threads. Moreover, the pilot portion of the chuck extends axially within the ball bearing thus to increase the effective diameter of the rotor shaft and to shorten the axial overhang of the chuck relative to the ball bearing so as to provide a compact tool in which the accuracy of rotation and strength are enhanced.

6 Claims, 2 Drawing Figures

PATENTED APR 17 1973

3,728,052

INVENTOR.
PHILIP A. SNIDER
BY
Oberlin, Maky, Donnelly & Renner
ATTORNEYS

AIR OPERATED TOOL

BACKGROUND OF THE INVENTION

In known air operated tools as disclosed for example in the U.S. Pat. to Doeden No. 2,830,560, the rotor of the vane motor in the tool housing has its ends supported in ball bearings at the front and rear shaft portions of the rotor, the front end of the rotor shaft being formed with screw threads for connection of a tool chuck thereto forwardly adjacent the front bearing. The front end of the rotor shaft which projects through the inner ring of the front bearing constitutes a pilot which closely fits in a bore in the rear end of the chuck but inaccuracy in the internal threads in the chuck may throw it off center so that a tool held thereby will not run true about an axis coinciding with the axis of rotation of the rotor.

Moreover, in such known air operated tools the threaded connection between the chuck and the rotor shaft is axially beyond the front bearing and thus there is a substantial overhang of the chuck thus to subject the rotor shaft to substantial bending loads and consequential deflection due to lateral loading imposed on the tool mounted in the chuck.

SUMMARY OF THE INVENTION

In contradistinction to known air operated tools the present tool has a chuck in threaded engagement with the rotor shaft and has a pilot portion which surrounds the rotor shaft and which is closely fitted within the front ball bearing of the tool, said pilot portion being coaxial with the rotor and with the tool holding portion of the chuck whereby the tool held by the chuck will run true with the rotor axis despite eccentricity of the chuck threads.

It is another object of this invention to provide an accurate construction as aforesaid which is further characterized in that the pilot portion of the chuck which surrounds the rotor shaft and which is disposed within the front bearing of the tool imparts rigidity to the rotor shaft and decreases the overhang of the tool holding portion of the chuck with respect to the front ball bearing.

Other objects and advantages of the present invention will appear hereinafter.

DETAILED DESCRIPTION OF THE INVENTION

Figures 1, 2:
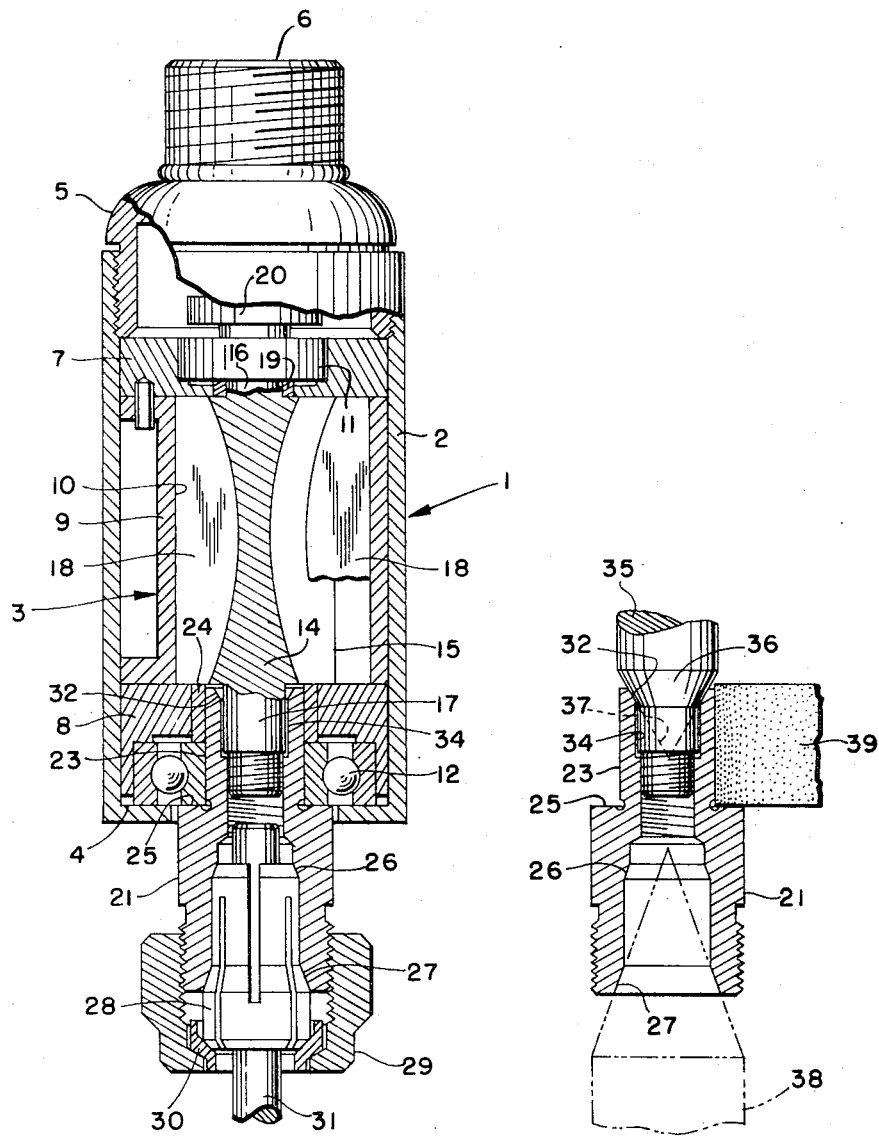
FIG. 1 is a cross-section view of an air operated tool embodying the present invention.
FIG. 2 is a cross-section view showing one manner of making the chuck body so that its axis coincides with the axes of the pilot portion and of the rotor when the chuck body is screwed onto the rotor shaft.

The air operated tool 1 herein comprises a housing 2 in which an air motor 3 is clamped against the housing shoulder 4 as by means of the end cap 5 having an air pressure inlet port 6. The motor stator comprises coaxial end plates 7 and 8 and an intervening stator sleeve 9 having an eccentrically disposed bore 10 therethrough, said end plates 7 and 8 having bores in which the outer rings of the respective ball bearings 11 and 12 are closely fitted.

The rotor 14 has a radially enlarged and radially slotted portion 15 between its upper and lower shaft portions 16 and 17 in which vanes 18 of plastic or like material are radially slidable in engagement with the eccentric bore 10 of the stator sleeve 9 and as evident, when air under pressure enters the motor chambers defined between the vanes 18, the bore 10, the rotor portion 15 through passages (not shown) in the end plate 7 and stator sleeve 9, the rotor 14 will be caused to rotate within the stator assembly. Air exhaust passages will also be provided as well known in the art. A spacer ring 19 is clamped between the slotted portion 15 of the rotor 14 and the inner ring of the upper bearing 11 as by means of the governor 20 which is screwed onto the upper rotor shaft 16 and which may be of the type disclosed in Snider U.S. Pat. No. 3,535,982.

Screwed onto the lower rotor shaft 17 is a chuck body 21 which has a pilot portion 23 which is a close fit in the inner ring of the lower bearing 12 and within the spacer ring 24. When the chuck body 21 is tightened it will clamp the inner ring of the bearing 12 and the spacer ring 24 between the square shoulder 25 of the chuck body 21 and the square end of enlarged portion 15 of the rotor 14. The outer ring of the bearing 12 is clamped between the housing shoulder 4 and the bottom of the bore in the end plate 8.

The chuck body 21 has tapered cam surfaces 26 and 27 which cooperate with the like tapered surfaces on the contractible collet 28 and as apparent, when the nosepiece 29 which is threaded onto said chuck body 21 is tightened it will, through the nose ring 30, cause axial upward movement of the collet 29 whereby the coacting tapered surfaces 26 and 27 will effect contraction of the collet 29 to tightly and accurately grip the shank 31 of a tool.

As known in the art of manufacture there is no problem in maintaining concentricity of external threads on a shaft such as the rotor shaft 17; however, in the manufacture of the chuck body 21, for example, the internal threads may be slightly eccentric with respect to the conical seat 32 and adjoining bore 34. For a reason which will now appear, the diameter of the bore 34 in the chuck body 21 is slightly larger than the diameter of the rotor shaft 17 and the pilot portion 23 is axially shorter than the aggregate axial width of the inner ring of the bearing 12 and the spacer ring 24.

In the manufacture of the chuck body the same is screwed onto an arbor 35 as shown in FIG. 2 which is just like the shaft portion 17 of the rotor 14 except for the provision of the conical surface 36 which seats against the conical seat 32 of the chuck body 21. Accordingly, the chuck body 21 will be held with its axis coinciding with the axis of the arbor 35 and hence of the rotor 14. With the chuck body 21 thus mounted on the arbor 35 the tapered cam surfaces 26 and 27 thereof may be ground to be coaxial with the seat 32 and arbor 35 despite any slight eccentricity of the internal threads in the body 21. If the eccentricity is greater than the clearance provided between the arbor 35 and body 21 threads, the portion of the arbor below the conical seat 32 may be slightly deflected. HOwever, in most cases, there will be no need to deflect the end of the arbor 35. The chuck body 21 may now be mounted as between centers 37 and 38 as shown in phantom lines engaged with the tapered seat 32 and the tapered cam surface 27, whereupon the surface of the pilot portion 23 and shoulder 25 may be ground by grinding wheel 39 so as to be coaxial with and normal to the seat 32 and tapered cam surfaces 26 and 27.

With the chuck body thus completed the same is merely screwed onto the rotor shaft 17 to clamp the inner ring of the bearing 12 and the spacer ring 24 between the enlarged slotted portion 15 of the rotor 14 and the shoulder 25 and, thus, when the tool 1 is used the chuck 21-28 and rotor 14 will be disposed in accurate coaxial alignment. Accordingly, the internal threads of the chuck body 21 which may be slightly eccentric with respect to the rotor 14 axis will be compensated for without any resulting inaccuracy in the rotation of the chuck body 21 and rotor 14 about a common axis.

I, therefore, particularly point out and distinctly claim as my invention:

1. An air operated tool comprising a housing; an air motor in said housing having a rotor journaled therein by ball bearings adjacent the ends of said motor; one end of said rotor having a coaxial threaded shaft portion which extends axially into the ball bearing at that end of the motor in coaxial radially spaced relation to the inner ring of said bearing; chuck means having screw-threaded engagement with said rotor shaft portion and having a pilot portion which is closely fitted within said inner ring; said pilot portion being coaxial with said chuck means and said rotor whereby eccentricity in the threads in said chuck means are ineffective to alter said coaxial relationship; said chuck means having a tool holding portion also disposed coaxially with respect to said pilot portion and said rotor.

2. The tool of claim 1 wherein said rotor and said chuck means have plane annular faces between which said inner ring is clamped.

3. The tool of claim 2 wherein said rotor shaft portion has a spacer ring radially spaced therearound between the annular face of said rotor and said inner ring, said pilot portion extending into and being closely fitted within said spacer ring, the aggregate axial width of said inner ring and said spacer ring being slightly greater than the axial width of said pilot portion from the annular face thereof to the axially inner end.

4. The tool of claim 2 wherein said motor comprises a stator having an eccentric bore with which vanes radially slidably carried by said rotor are engaged, and end plates having bores in which the outer rings of the respective ball bearings are closely fitted.

5. An air operated tool comprising a housing having an air motor therein; said motor comprising a stator assembly including end plates and an intervening stator sleeve defining therebetween an eccentrically disposed motor chamber, ball bearings having outer rings closely fitted in bores in the respective end plates, a rotor journaled by said bearings and having an enlarged portion between its ends disposed in said chamber and carrying radially slidable vanes which move radially outward and inward in contact with such eccentrically disposed bore whereby said rotor is driven in said stator assembly in response to admission of air pressure into said housing and motor chamber; said rotor having a coaxial shaft portion at one end which is closely fitted in the inner ring of one bearing thus to support that end of the rotor for rotation about the axis of said one bearing; said rotor at its other end having a coaxial threaded shaft portion which extends axially through the other end plate and axially in coaxial radially spaced relation within the inner ring of the other bearing; chuck means for gripping a rotary tool and having a pilot portion which is screwed onto said threaded shaft portion; said pilot portion having a close fit within the inner ring of said other bearing and having a shoulder portion which radially overlaps and abuts the axially outer end of said inner ring; said pilot portion being coaxial with the axis of rotation of said rotor and coaxial with a tool adapted to be held by said chuck means, whereby eccentricity of the threads in said pilot portion are ineffective to cause eccentricity of said chuck means with respect to said rotor.

6. The tool of claim 5 wherein said chuck means comprises a chuck body having said pilot portion and a contractible collet therein having interengaged tapered surfaces which are effective to contract the collet to grip a tool shank upon axial movement of said collet into said chuck body, the tapered surface in said chuck body being coaxial with said rotor and said pilot portion.

* * * * *